March 29, 1949.   S. H. HOLT   2,465,874
PUMP PLUNGER
Filed Jan. 13, 1947
Fig. 2
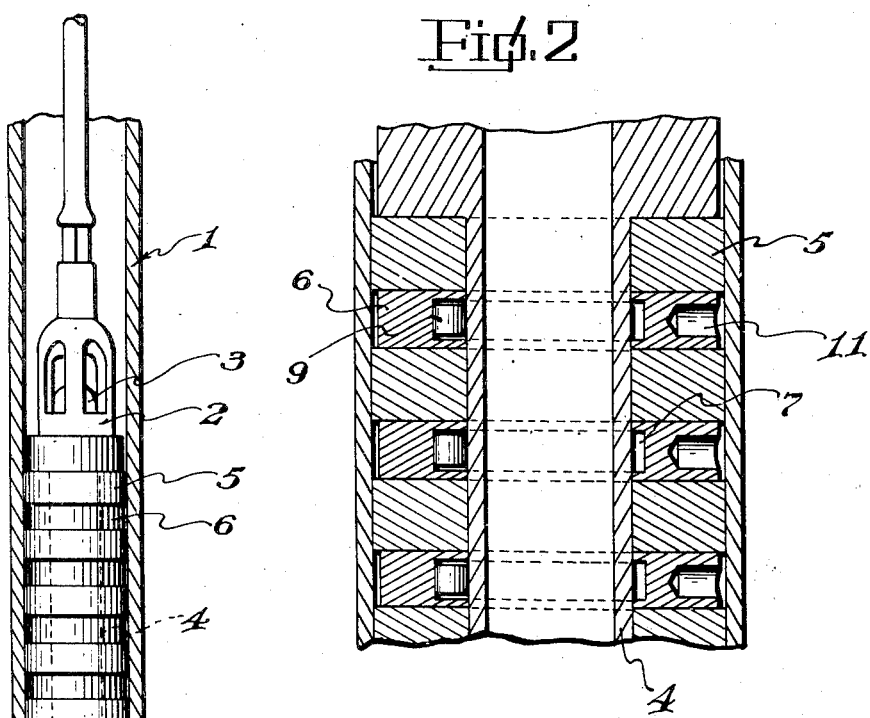
Fig. 3
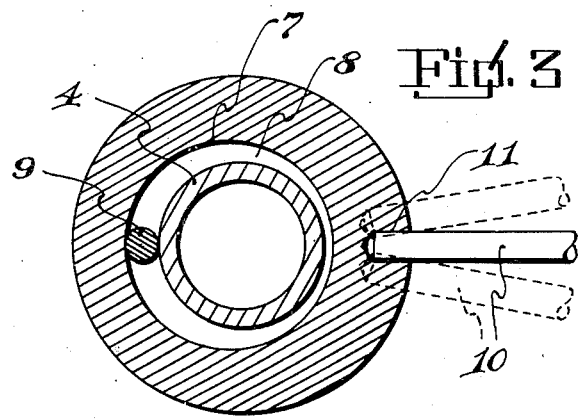
Fig. 1
Sherman H. Holt
Inventor
Philip A. Herrell
Attorney Patented Mar. 29, 1949

2,465,874

UNITED STATES PATENT OFFICE 2,465,874

PUMP PLUNGER

Sherman H. Holt, Tulsa, Okla.

Application January 13, 1947, Serial No. 721,824

1 Claim. (Cl. 309—4)

The invention relates to pump plungers, of the oil well type, and has for its object to provide a device of this kind wherein a plurality of felt, fabric, or other compressible rings are used for engaging the pump casing, and to provide eccentrically mounted and jammed spacer rings between the other rings for holding the compressible rings against axial movement, and against jamming or packing upwardly or downwardly, according to the movement of the plunger.

A further object is to provide eccentric channels in the inner periphery of the locking ring for the reception of jamming and locking rollers cooperating with the outer periphery of the depending sleeve, and means whereby said locking rings may be rotated and locked as the plunger packings are placed in position. The rings positively hold the packing rings from axial movement after they are once properly positioned.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a side elevation of the pump plunger, showing the same in a well casing.

Figure 2 is a vertical transverse sectional view through a portion of the upper end of the plunger, and a portion of the well casing.

Figure 3 is a horizontal sectional view through one of the locking rings, showing the method of locking the rings.

Referring to the drawing, the numeral 1 designates a conventional form of pump casing, and 2 the valve cage having a valve 3. Depending from the valve cage is a tubular sleeve 4, on which the various packing and locking elements are mounted. The annular packing members 5 may be formed from any material, however they are preferably fabric impregnated, and adapted, during the reciprocation of the plunger, to engage the inner periphery of the pump casing 1.

It has been found that unless each packing ring 5 is individually locked against axial movement that the packing rings will compress and compact towards the end of the plunger according to the direction of movement of the plunger. To overcome this difficulty, as each packing ring 5 is placed in position, one of the locking rings 6 is placed on the sleeve 4. Each locking ring has an eccentric bore 7 and an inner channel 8 in which is disposed a roller 9, and which roller 9, preferably, exactly fits the space between the outer periphery of the sleeve 4 and the bottom of the channel 8 as shown in Figure 3.

In assembling the device the upper packing ring 5 is placed in position, and then the next locking ring 6 is placed in position against the lower side of the packing ring with the roller 9, shown in Figure 3, in position; then the pin 10 is inserted in the locking ring aperture 11 and the locking ring rotated so that the roller 9 will wedge against the outer periphery of the sleeve, thereby locking the ring against axial movement on the sleeve 9. The above operation continues until all of the packing and locking rings are assembled, and then the sleeve 12 is placed on the lower end of the tubular section 4, and securely held by the lock nut 13, therefore it will be seen that all of the packing rings are individually held against axial movement, hence can not pack towards either end of the sleeve as the piston is reciprocated in the pump casing.

From the above it will be seen that a pump plunger is provided which can be easily assembled and one wherein the packing rings are individually held by the locking rings against axial displacement in either direction during the reciprocation of the plunger.

The invention having been set forth what is claimed as new and useful is:

A locked piston packing surrounding a reciprocating member, said packing comprising a plurality of spaced compressible packer rings surrounding said reciprocating member, rotatable locking rings mounted on the reciprocating member and interposed between the packing rings, said rotatable locking rings having eccentric bores, the inner peripheries of said locking rings being channeled and jamming rollers in said channels and cooperating with the outer periphery of the reciprocating member for locking said locking rings on the reciprocating member and against axial movement in relation to the axis of the reciprocating member.

SHERMAN H. HOLT.

REFERENCES CITED

The following references are of record in the file of this patent:

UNITED STATES PATENTS

| Number | Name | Date |
|---|---|---|
| 846,874 | Swan | Mar. 12, 1907 |
| 1,200,734 | Kenyon | Oct. 10, 1916 |
| 1,547,117 | Green | July 21, 1925 |
| 2,429,898 | Solis | Oct. 28, 1947 |